United States Patent [19]

Dietzsch et al.

[11] 4,418,743

[45] Dec. 6, 1983

[54] ELECTRONIC CIRCUIT FOR CONTROLLING A HEATING OR AIR-CONDITIONING APPARATUS IN A MOTOR VEHICLE

[75] Inventors: Kurt Dietzsch, Leonberg-Eltingen; Rainer Knoblauch, Stuttgart, both of Fed. Rep. of Germany

[73] Assignee: Süddeutsche Kühlerfabrik Julius Fr. Behr GmbH & Co. K.G., Stuttgart, Fed. Rep. of Germany

[21] Appl. No.: 255,261

[22] Filed: Apr. 17, 1981

[30] Foreign Application Priority Data

Apr. 25, 1980 [DE] Fed. Rep. of Germany ....... 3015921

[51] Int. Cl.³ ..................... F28D 21/00; F28F 27/00
[52] U.S. Cl. ..................................... 165/12; 165/43; 236/36; 236/91 G; 62/158; 237/5
[58] Field of Search ............... 236/36, 91 G; 165/12, 165/41, 42, 43; 62/158; 237/5, 12.3 B

[56] References Cited

U.S. PATENT DOCUMENTS

| | | | |
|---|---|---|---|
| 3,796,892 | 3/1974 | Stewart | 62/158 |
| 3,871,443 | 3/1975 | Jones | 165/12 |
| 4,058,255 | 11/1977 | Linder et al. | 237/12.3 B |
| 4,142,375 | 3/1979 | Abe et al. | 62/158 |
| 4,180,234 | 12/1979 | Hertfelder | 251/14 |
| 4,189,093 | 2/1980 | Schnaibel et al. | 236/91 G |
| 4,262,738 | 4/1981 | Kato et al. | 165/43 |

FOREIGN PATENT DOCUMENTS 2531015 7/1975 Fed. Rep. of Germany .
1397426 5/1972 United Kingdom .

Primary Examiner—William R. Cline
Assistant Examiner—John K. Ford
Attorney, Agent, or Firm—Browdy and Neimark

[57] ABSTRACT

An electronic circuit for controlling the heating or air conditioning apparatus in an automobile permits the capability of heating the vehicle without the heat surges which can occur after short periods of ignition turn off and permitting manual on-off control of the heating system even if the thermostat fails. A second circuit for controlling the device activating the valve controls the flow of heating or cooling medium independently of the ignition switch and contains a timer to keep the valve closed for a predetermined time after ignition switch-off. Two limit switches are also present for permitting the valve to be set at an open or closed position independently of both the ignition switch and the timer.

5 Claims, 1 Drawing Figure

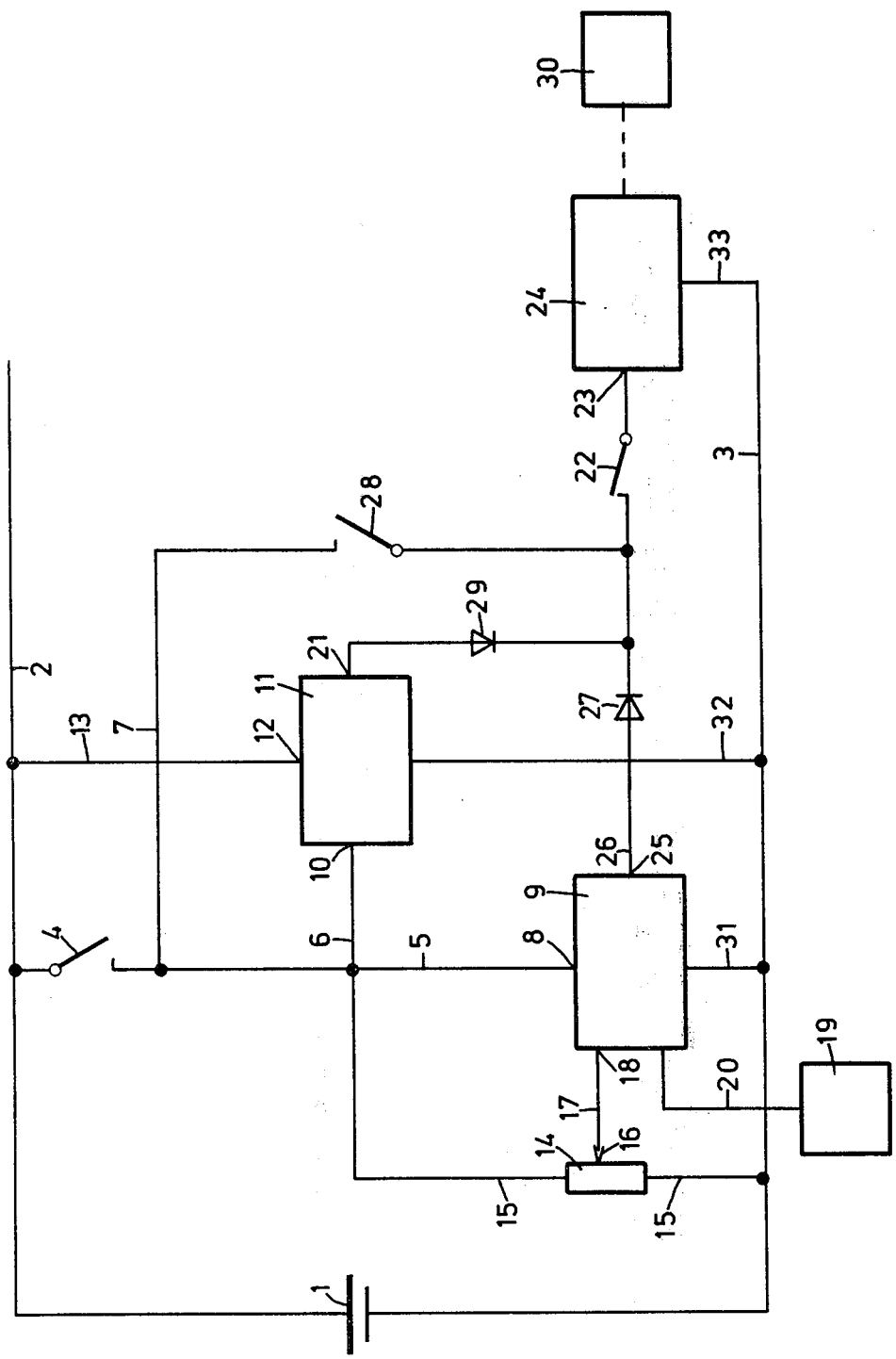

ELECTRONIC CIRCUIT FOR CONTROLLING A HEATING OR AIR-CONDITIONING APPARATUS IN A MOTOR VEHICLE

FIELD OF THE INVENTION

The present invention relates to an electronic circuit for controlling a heating or air-conditioning apparatus in a motor vehicle to permit heating of the vehicle even if the thermostat is out of commission.

BACKGROUND OF THE INVENTION

Electronic circuits for controlling a heating or air-conditioning apparatus in a motor vehicle are known, for example, from German Offenlegungsschrift No. 2,351,015 and U.S. Pat. No. 4,058,255. In such electronic circuits, the valve, which is located in a flow channel, is opened when the system for controlling the valve-activating device fails, thereby satisfying the demand of the manufacturers of motor vehicles for a capability to heat such motor vehicles even when the thermostat goes out of commission. However, significant disadvantages are connected with the known electronic circuits:

A. Every time the ignition switch is turned off—that is, every time the ignition is interrupted—the valve opens. As a result of the pumping work of the cooling agent pump, which is driven by the engine (which is slowing down), and the thermosiphon flow which is building up, hot heating water gets into the heating system's heat exchanger. If the vehicle is put back into operation before the heating water has cooled off, the heat stored in the heating system's heat exchanger goes inside the motor vehicle through the heating duct. A so-called heat surge is generated. It is especially bothersome when the ignition switch is activated briefly or frequently—for example, during short stops at coin-operated machines or letter boxes or when the engine is turned off at railroad barriers and intersections where there are traffic lights.

B. If the control of the valve is interrupted by a defect in the thermostat, the heating system is started up by the valve which then is not receiving any current and consequently is open. This can occur especially when there is high thermal stress on the thermostat's electronic equipment in warm seasons or in hot countries in general. Then the undesired turning on of the heating system is not only bothersome but it can even affect the driver of the vehicle in a way which is dangerous to traffic. Not only the driver of the vehicle but also the other electronic devices of a vehicle are affected unfavorably by too much heat inside the vehicle.

C. If, however, the system controlling the valve is short-circuited by a defect in the thermostat, the heating system is cut off by the valve, which is closed in the energized condition. This can make it impossible to use the vehicle when the outdoor temperature is low.

D. The circuit must operate continually to keep the valve closed, and it must do so even when there is no question of a need for heating the vehicle because of the ambient temperature.

SUMMARY OF THE INVENTION

Therefore, the object of the present invention is to eliminate the disadvantages encountered with the wiring arrangements which have been available up to now and to indicate an improved wiring arrangement by means of which the so-called heat surges, in particular, can be avoided and the valve in question can be opened or closed without fail, even if the electronic apparatus fails.

That task is accomplished by the present invention by simultaneously connecting the valve-activating device into a second circuit which is independent of the ignition-switch contacts and is equipped with two limit switches incorporated into the temperature setting means, the second circuit being a circuit which is parallel to the first circuit and has a timing element which can be switched into the circuit when the first circuit is cut out by the ignition switch and which is connected with the valve-activating device.

The second circuit of the present invention, which is independent of the ignition-switch contacts, has the advantage that additional steps can be taken which work independently of the ignition switch, and which do so in such a way that the valve-activating device keeps the valve closed in the flow channel for a fluid which serves as a heat carrier until its heat convection has died away, so that no additional heat can get into the heating system's heat exchanger or into the inside of the vehicle.

Equipping the valve-activating device with two limit switches incorporated into the temperature setting means has the advantage that the mechanism controlling the valve-activating device can be worked manually, so that emergency operation is possible.

Current is sent to the valve-activating device for a short period of time by the timing element which is located in the second circuit and which is switched on for a certain amount of time when the ignition, and with it the first circuit, is cut off.

One of the limit switches is a "hot" limit switch and the other is a "cold" limit switch. The valve-activating device is connected through the "hot" limit switch to the "cold" limit switch which is connected with a contact of the ignition switch. This permits the advantage that the flow of current to the valve-activating device is interrupted when the "hot" limit switch is opened by setting the setting means at one extreme end positioned thereof.

The valve is always opened by that means and heating in emergency operation is available for the vehicle. If on the other hand, the setting means is adjusted to the opposite end position so that the "cold" limit switch is actuated, current is sent to the valve-activating device by that means when the ignition is turned on, so that the valve-activating device keeps the valve of the flow channel for the heating fluid closed, no matter what the settings of other controls may be. Since the "cold" limit switch only provides current to the valve-activating device through the ignition switch, no undesired attenuation of the vehicle's power system can occur because of the valve-activating device.

The valve is also closed by control from the timing element and by control signals or control impulses from the outlet of the thermostat.

The advantage that the vehicle's power system is only under a load for a short time when stopped is the result of making the timing element in such a way that the closed circuit condition is automatic and no current is needed in the open-circuit condition.

The valve-activating device can have its timing controlled by trigger pulses with a steady frequency and with a variable width in accordance with a temperature signal formed by "nominal value-actual value" comparison. This has the advantage that the valve in the flow channel is only connected between the entirely open and the entirely closed positions in accordance with the width of the trigger pulses, so that special technical advantages are obtained when the regulating of the flow of the heating medium is following its normal course (more precise and faster regulation, less power consumption, quicker heating, etc.).

In that connection, the timing control of the valve-activating device by the thermostat is accomplished in an advantageous manner.

BRIEF DESCRIPTION OF THE DRAWING

Additional features and advantages will be apparent from the following description of an embodiment with the help of the diagram, in which a schematic diagram of an electronic circuit in accordance with the present invention is presented.

DETAILED DESCRIPTION OF PREFERRED EMBODIMENTS

The vehicle's power system, here represented by a battery 1, is connected with the electronic circuits of the invention by leads 2 and 3. A contact 4 of the ignition switch connects the power system lead 2 with the first circuit, which consists of leads 5, 26 and 31, with lead 5 leading to a positive supply voltage connection 8 of a thermostat. A lead 6 leads to the trigger input 10 of a timing element 11 which is connected with a second circuit 13 through an operating-voltge input 12, and that second circuit 13, for its part, leads to the battery 1 through the lead 2. A manually-adjustable setting means 14, which is led to the leads 3 and 5 through the lead 15, has a tap 16 which leads to an input 18 of the thermostat 9 through a lead 17. The actual value of the temperature for the thermostat 9 is delivered to the thermostat 9 through a sensor combination 19 and a lead 20. The timing element 11 is connected to an input 23 of a valve-activating device 24 through its output 21, a diode 29 and a "hot" limit switch 22. An output 25 of the thermostat 9 is connected with the "hot" limit switch 22, and through it to the valve-activating device 24, through the lead 26 of the first conduit and diode 27.

A lead 7 which branches off from the first circuit leads to the valve-activating device 24 through a "cold" limit switch 28 and also through the "hot" limit switch 22 the valve-activating device 24 is connected to a valve 30.

The thermostat 9, the timing element 11 and the valve-activating device 24 are connected with the lead 3 of the power system through the leads 31, 32 and 33, respectively.

It is advantageous for the valve-activating device 24 and the valve 30 to be devices which are of a purely electrical or electropneumatic type, as is described in British Pat. No. 1,397,426, DE-OS 25 31 015, U.S. Pat. No. 4,058,255 and U.S. Pat. No. 4,180,234. The limit switches 22, 28 can be microswitches which are available commercially or, since an exact switching point is not required, simple switch lugs such as are customarily used in relays. However, they also can consist of sliding contacts with corresponding contact lugs.

The timing element 11 which is located in the second circuit has a relay in its inner circuit (not shown) which is designed in such a way that a contact is closed through which the timing element 11 is then fed with current from the battery 1 when the first circuit is cut off—that is, by opening the contact 4.

The electronic circuit functions as follows:

When the motor vehicle is turned off and after the period when the timing element 11 is out of action is over, that is, after a rather long interruption to operation, no consumer is connected with the power system since both the contact 4 of the ignition switch and the contact of the relay of the timing element 11 are open. Thus, no additional demands are being made of the battery 1.

The valve-activating device 24 has completely opened the valve 30.

When the ignition switch is activated again, voltage is sent to the supply voltage connection 8 of the thermostat 9 through the contact 4, which then is closed, and signals are also conveyed to the thermostat 9 through the input 18 and the lead 20. One of those signals is a voltage in conformity with the setting of the setting means 14 and the other is a voltage in conformity with the output signal of the sensor combination 19. After the signals have been processed and amplified in the thermostat 9, a control curent is sent to the valve-activating device 24 through its output stage, the outlet 25, the diode 27 and through the "hot" limit switch 22, and that control curret controls the valve 30. In addition, the "hot" limit switch 22 is designed as a normally-closed contact and is always closed when the setting means 14 is not in its final "hot" position.

Furthermore, the thermostat 9 can be designed in such a way that trigger pulses with a steady frequency and with a variable pulse width in accordance with a temperature signal formed by "nominal value-actual value" comparison are generated by it by means of additional devices which are not shown in detail. The valve-activating device 24 can be controlled with regard to timing by those trigger pulses. Such regulating devices are known from DE-Os No. 25 31 015 and U.S. Pat. No. 4,058,255, for example. Consequently, when the heating system is operating normally, the valve 30 is alternately switched only to the "entirely open" and "entirely closed" positions by the valve-activating device 24 with constant frequency. Thus, the valve 30 will move exactly as much heating fluid as is called for by the setting of the setting means. If the ignition switch is off—that is, if the contact 4 is opened—the control of the valve-activating device 24 is interrupted by the thermostat 9. Furthermore, no more positive voltage is conveyed to the trigger input 10 of the timing element 11. The relay of the timing element 11 attracts and closes the corresponding contact, which then conveys positive voltage from the second circuit 13. A current corresponding to that voltage is fed through that closed contact to the output 21 of the timing element 11, which is in the closed-circuit condition, and thereby to the valve-activating device 24, which closes the valve 30 as long as positive current is fed to the latter from the timing element 11, so that no heat surges can occur.

After the period when the timing element 11 is in action is over, the contact opens and thereby turns off not only the timing element 11 itself but also the valve-activating device 24. In the meantime, the heating-water circuit has cooled off.

The "hot" limit switch 22 serves as an emergency setting of the valve 30. If it is opened when the setting means 14 is in the "hot" position, no current can reach the valve-activating device 24, so that the valve 30 is completely open and consequently permits the heating of the inside of the vehicle. On the other hand, when the setting means 14 is in the "cold" position the "cold"

limit switch 28 is activated, so that current goes to the valve-activating device 24, and as a result it closes. An endurable heating of the vehicle in emergency operation can be adjusted by hand by activating one of the two extreme positions of the setting means 14.

If it is not necessary to heat the vehicle, the setting means 14 is set at its extreme "cold" position, and as a result the "cold" limit switch 28 is closed. Now current goes through the contact 4 of the ignition switch and the lead 7 and the "hot" limit switch 22, which, as a normally-closed contact, is closed, to the valve-activating device 24 and causes the valve 30 to close completely.

The invention is not limited to the embodiment which has been shown and described. It also includes all modifications and further developments of the features and steps which have been described and are thus to be considered part of the present generic invention. Thus, for example, the significant features of the invention, such as the setting means, the limit switches and/or the timing element can be integrated in a control device along with the thermostat.

What is claimed is:

1. In an electronic circuit for controlling the heating or air conditioning apparatus in a motor vehicle having its own power system, an ignition switch, an electronic thermostat, a manually adjustable temperature setting means, a valve activating device and valve means for controlling the flow of conditioning medium within the heating or air conditioning apparatus, said arrangement comprising said ignition switch, said thermostat and said valve activating device being connected in series with the vehicle's power system in a first circuit, said thermostat being controlled by said manually adjustable temperature setting means, and said valve means being controlled by said valve activating device, whereby current to said thermostat and said valve activating device is interrupted when said ignition switch is open, the improvement wherein said motor vehicle further includes a timing element means for switching on to allow flow of current therethrough for a predetermined time after said ignition switch has been opened, and two limit switch means for permitting said valve activating device to be actuated or deactuated, respectively, independently of said ignition switch and said timing element means, and wherein said arrangement further comprises said valve activating device being simultaneously connected into a second circuit connected to the vehicle's power system in parallel with said ignition switch, said second circuit including said timing element means, such that flow of current to said valve activating device is permitted through said timing element means for a predetermined time after said ignition switch has been opened, and has turned off said first circuit, and wherein said two limit switch means are controllable by means of said temperature setting means.

2. An electronic circuit in accordance with claim 1 wherein one of said limit switch means is a "hot" limit switch and the other is a "cold" limit switch and wherein said valve-activating device is connected through said "hot" limit switch to said "cold" limit switch, which in turn is connected in series with said ignition switch and in parallel with said thermostat.

3. An electronic circuit as claimed in claim 1 or claim 2, wherein said timing element is made in such a way that its closed-circuit condition is self sustained and no current is needed in the open-circuit condition.

4. An electronic circuit as claimed in claim 1, wherein said valve-activating device has its timing controlled by trigger pulses with a steady frequency and with a variable width in accordance with a temperature signal formed by "nominal value-actual value" comparison.

5. An electronic circuit as claimed in claim 4, wherein the timing control of said valve-activating device is accomplished by said thermostat.

* * * * *